(12) United States Patent
Shimizu et al.

(10) Patent No.: US 8,277,874 B2
(45) Date of Patent: Oct. 2, 2012

(54) MANUFACTURING METHOD OF MAGNETIC RECORDING MEDIUM, THE MAGNETIC RECORDING MEDIUM, AND MAGNETIC RECORDING AND REPRODUCING APPARATUS

(75) Inventors: Sanae Shimizu, Kawasaki (JP); Yuji Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 700 days.

(21) Appl. No.: 12/256,148

(22) Filed: Oct. 22, 2008

(65) Prior Publication Data

US 2009/0244783 A1   Oct. 1, 2009

(30) Foreign Application Priority Data

Mar. 26, 2008   (JP) ................. 2008-081639

(51) Int. Cl.
*G11B 5/55* (2006.01)
(52) U.S. Cl. .................................. 427/130
(58) Field of Classification Search .......... 427/128, 427/130, 131, 129
See application file for complete search history.

(56) References Cited

U.S. PATENT DOCUMENTS

| | | | |
|---|---|---|---|
| 6,699,332 B1 | 3/2004 | Piramanayagam et al. | |
| 6,753,043 B1* | 6/2004 | Kuo et al. | 427/526 |
| 2005/0214450 A1 | 9/2005 | Aoyama et al. | |
| 2006/0269797 A1* | 11/2006 | Lu et al. | 428/834 |
| 2006/0289382 A1* | 12/2006 | Kikitsu et al. | 216/22 |
| 2009/0180213 A1 | 7/2009 | Fukushima et al. | |

FOREIGN PATENT DOCUMENTS

| | | | |
|---|---|---|---|
| JP | 01237944 | * | 9/1989 |
| JP | 5-205257 | | 8/1993 |
| JP | 6 2001-25021 | | 9/2001 |
| JP | 2002-56529 | | 2/2002 |
| JP | 2002-288813 | | 10/2002 |
| JP | A 2005-228912 | | 8/2005 |
| JP | 2006-147046 | | 6/2006 |
| JP | 2007-226862 | | 9/2007 |

OTHER PUBLICATIONS

Japanese Office Action issued in corresponding Japanese App. No. 2008-081639, mailed Mar. 21, 2012.

* cited by examiner

*Primary Examiner* — Michael Cleveland
*Assistant Examiner* — Tabassom Tadayyon Eslami
(74) *Attorney, Agent, or Firm* — Greer, Burns & Crain, Ltd.

(57) ABSTRACT

A manufacturing method of a magnetic recording medium, the magnetic recording medium having a structure where plural magnetic recording areas and isolation areas in a magnetic recording layer are formed on a non-magnetic substrate, the isolation areas being configured to magnetically isolate the magnetic recording areas, the manufacturing method includes a step of forming the magnetic layer on the non-magnetic substrate, the magnetic layer being made of a hard magnetic material having a magnetic coercive force whereby magnetic recording is impossible; and a step of performing ion implantation partially at positions corresponding to the plural magnetic recording areas of the magnetic layer so that the magnetic recording areas are formed by reducing the magnetic coercive force in the positions of the ion implantation to a magnetic-recordable magnetic coercive force, and allowing the isolation areas to maintain the magnetic coercive force whereby magnetic recording is impossible.

5 Claims, 8 Drawing Sheets

FIG.3

| | IMPLANTATION ENERGY (keV) | IMPLANTATION TIME (sec.) | Hc (kOe) | STANDARDIZATION Ms* (-) |
|---|---|---|---|---|
| REFERENCE EXAMPLE | 0 | 0 | 8.5 | 1.00 |
| EXAMPLE 1-1 | 20 | 120 | 6.9 | 0.95 |
| EXAMPLE 1-2 | 20 | 300 | 5.6 | 0.95 |
| EXAMPLE 1-3 | 20 | 480 | 5.3 | 0.94 |
| EXAMPLE 1-4 | 20 | 600 | 5.1 | 0.91 |

FIG.5

| | IMPLANTATION ENERGY (keV) | IMPLANTATION TIME (sec.) | Hc (kOe) | STANDARIZATION Ms* (-) |
|---|---|---|---|---|
| REFERENCE EXAMPLE | 0 | 0 | 8.5 | 1.00 |
| EXAMPLE 1-1 | 20 | 120 | 6.9 | 0.95 |
| EXAMPLE 2-1 | 10 | 120 | 6.4 | 0.96 |
| EXAMPLE 2-2 | 5 | 120 | 6.1 | 0.96 |
| EXAMPLE 2-3 | 5 | 180 | 5.8 | 0.93 |

FIG.7

| | IMPLANTATION ENERGY (keV) | IMPLANTATION TIME (sec.) | Hc (kOe) | STANDARDIZATION Ms* (-) |
|---|---|---|---|---|
| REFERENCE EXAMPLE | 0 | 0 | 8.5 | 1.00 |
| EXAMPLE 1-1 | 20 | 120 | 6.9 | 0.95 |
| EXAMPLE 3-1 | 25 | 120 | 7.3 | 0.95 |
| EXAMPLE 3-2 | 30 | 120 | 7.5 | 0.96 |
| EXAMPLE 3-3 | 5 | 300 | 5.3 | 0.95 |
| EXAMPLE 3-4 | 5 | 480 | 5.2 | 0.95 |

MANUFACTURING METHOD OF MAGNETIC RECORDING MEDIUM, THE MAGNETIC RECORDING MEDIUM, AND MAGNETIC RECORDING AND REPRODUCING APPARATUS

BACKGROUND OF THE INVENTION

1. Field of the Invention

The present invention generally relates to manufacturing methods of magnetic recording media, the magnetic recording media, and magnetic recording and reproducing apparatuses. More specifically, the present invention relates to a manufacturing method of a magnetic recording medium whereby a magnetic pattern is formed by ion implantation, the magnetic recording medium, and a magnetic recording and reproducing apparatus.

2. Description of the Related Art

Hard disk drives (HDD) are mainly used as mass storage devices whereby high speed access or high speed transmitting of data can be realized. The surface recording density of the hard disk drives (HDD) is being improved at an annual rate of 100% and further improvement of recording densities is expected.

In order to improve the recording densities of the HDDs, reduction of the track width or the recording bit length is necessary. However, if the track width is reduced, neighboring tracks may easily interfere with each other. Due to such a reduction of the track width, the magnetic recording information may be easily overwritten in the neighboring tracks at the time of recording. Cross-talk due to leakage magnetic fields from the neighboring tracks may easily occur at the time of reproducing.

The above-mentioned problems cause reduction of the S/N ratio of a reproduction signal so that the error rate may be degraded. In addition, if the reducing the recording bit length is continued, stability of the bit becomes degraded and the phenomenon of heat fluctuation is generated.

On the other hand, in a case of perpendicular magnetic recording, magnetizations of neighboring bits of a disk medium do not face each other and the bits are strengthened. The perpendicular magnetic recording is advantageous for high density recording in principle compared to longitudinal magnetic recording where magnetizations of neighboring bits face to each other. Hence, a lot of companies have started conversion to a perpendicular magnetic recording type.

However, in a perpendicular magnetic recording type where conventional continuous media are used, it is difficult to realize extra high density recording equal to or greater than 1 Tbpsi. Because of this, a bit pattern medium (hereinafter "BPM") is attractive as a way for realizing the extra high density recording. In the BPM, a medium recording film is processed so that a bit pattern is formed on the disk in advance.

However, in a forming method of the magnetic recording medium by the BPM, a portion other than the bit pattern is etched so that the magnetic film is removed and then a non-magnetic material is supplied and flattened to fill in that portion. Hence, it is necessary to perform complex manufacturing processes so that the manufacturing cost may increase.

As a method for solving such a problem, a processing method whereby ions are implanted into a magnetic film so that a magnetic state is partially changed has been suggested. See Japanese Laid-Open Patent Application Publication No. 2005-228912. In this method, since the magnetic state is changed by implanting the ions, a complex manufacturing process such as etching, filling or flattening is not required so that increase of the manufacturing cost is prevented.

As a manufacturing method of the BPM by the ion implantation in the conventional art, a method has been used where, for example, ion implantation is partially performed on a FePt magnetic film having a CuAuI type ordered structure with high magnetic anisotropy so that a low coercive force is achieved. In this conventional method, an area where ion implantation is performed is treated as a magnetic recording impossible area (isolated area) and an area where ion implantation is not performed is treated as a magnetic recording possible area.

As discussed above, in the conventional manufacturing method of the BPM, a magnetic recordable material is selected as a magnetic film formed on a substrate, and ion implantation is performed on a portion other than the recording area layer so that the isolation layer is formed; thereby a recording area and an isolation area are formed in the same magnetic film.

However, in the conventional manufacturing method of the BPM, the magnetic properties of the recording area are the same as the magnetic properties of the magnetic film formed on the substrate so that it is difficult to improve the magnetic properties.

SUMMARY OF THE INVENTION

Accordingly, embodiments of the present invention may provide a novel and useful manufacturing method of a magnetic recording medium, the magnetic recording medium, and a magnetic recording and reproducing apparatus, solving one or more of the problems discussed above.

More specifically, the embodiments of the present invention may provide a manufacturing method of a magnetic recording medium whereby magnetic properties of a recording layer for magnetic recording can be controlled, the magnetic recording medium, and a magnetic recording and reproducing apparatus.

One aspect of the present invention may be to provide a manufacturing method of a magnetic recording medium, the magnetic recording medium having a structure where plural magnetic recording areas and isolation areas in a magnetic recording layer are formed on a non-magnetic substrate, the isolation areas being configured to magnetically isolate the magnetic recording areas, the manufacturing method including: a step of forming the magnetic layer on the non-magnetic substrate, the magnetic layer being made of a hard magnetic material having a magnetic coercive force whereby magnetic recording is impossible; and a step of performing ion implantation partially at positions corresponding to the plural magnetic recording areas of the magnetic layer so that the magnetic recording areas are formed by reducing the magnetic coercive force in the positions of the ion implantation to a magnetic-recordable magnetic coercive force, and allowing the isolation areas to maintain the magnetic coercive force whereby magnetic recording is impossible.

Another aspect of the present invention may be to provide a magnetic recording medium, including a magnetic recording layer formed on a non-magnetic substrate, the magnetic recording layer having plural magnetic recording areas and isolation areas, the isolation areas being configured to magnetically isolate the magnetic recording areas, wherein the magnetic recording areas have a magnetic coercive force whereby magnetic recording is impossible; and the isolation areas have a magnetic recordable magnetic coercive force smaller than the magnetic coercive force of the magnetic recording areas.

Another aspect of the present invention may be to provide a magnetic recording and reproducing apparatus, including: a magnetic recording medium; a magnetic head configured to perform a magnetic recording and reproducing process on the magnetic recording medium; an arm configured to support the magnetic head; and a moving part configured to move the arm, wherein the magnetic recording medium includes a magnetic recording layer formed on a non-magnetic substrate, the magnetic recording layer having plural magnetic recording areas and isolation areas, the isolation areas being configured to magnetically isolate the magnetic recording areas, the magnetic recording areas have a magnetic coercive forces whereby magnetic recording is impossible; and the isolation areas have a magnetic recordable magnetic coercive force smaller than the magnetic coercive force of the magnetic recording areas.

Additional objects and advantages of the invention (embodiment) will be set forth in part in the description which follows, and in part will become obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 3 is a table showing magnetic properties of the magnetic recording medium of the first embodiment of the present invention and a comparison example;

FIG. 5 is a table showing magnetic properties of the magnetic recording medium of the second embodiment of the present invention and a comparison example;

FIG. 7 is a table showing magnetic properties of the magnetic recording medium of the third embodiment of the present invention and a comparison example.

DETAILED DESCRIPTION OF THE PREFERRED EMBODIMENTS

A description is given below, with reference to FIG. 1 through FIG. 8 of embodiments of the present invention.

Figure 1A:
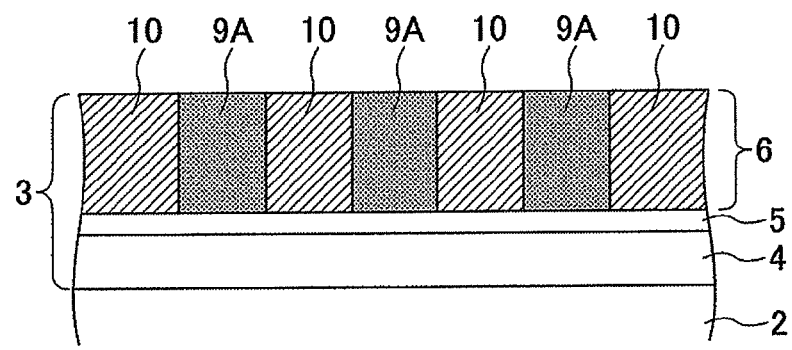
FIG. 1A is a cross-sectional view of a magnetic recording medium of a first embodiment of the present invention.
Figure 1B:
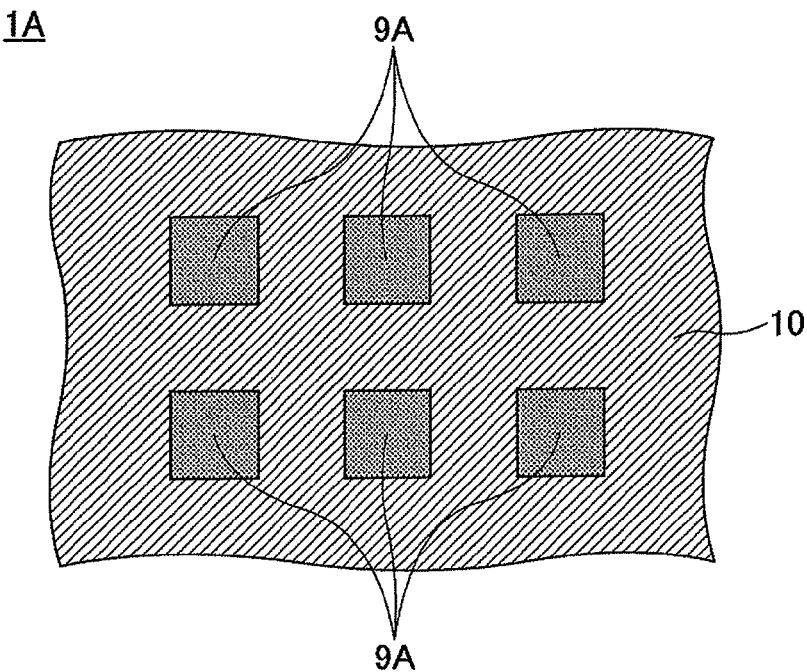
FIG. 1B is a plan view of the magnetic recording medium of the first embodiment of the present invention.

FIG. 1A is a cross-sectional view of a perpendicular magnetic recording medium 1A (hereinafter "a magnetic recording medium 1A") of a first embodiment of the present invention. FIG. 1B is a plan view of the magnetic recording medium 1A of the first embodiment of the present invention.

As shown in FIG. 1A, the magnetic recording medium 1A has a structure where a magnetic recording film 3 is stacked on a non-magnetic substrate 2. The magnetic recording film 3 is formed by stacking a soft magnetic layer 4, an intermediate layer 5, and a hard magnetic layer 6. A protection layer (not shown in FIG. 1) configured to protect the hard magnetic layer 6 is formed on an upper surface of the magnetic recording film 3. The magnetic recording medium 1A is used as, for example, a magnetic recording and reproducing medium of a hard disk drive (HDD).

The non-magnetic substrate 2 functions as a supporting member of the magnetic recording film 3. The non-magnetic substrate 2 is made of a non-magnetic material such as glass, aluminum, or silicon (Si). In this embodiment, a glass substrate (hereinafter "glass substrate 2") is used as the non-magnetic substrate 2.

The soft magnetic layer 4 forming part of the magnetic recording film 3 is formed on the glass substrate 2. The soft magnetic layer 4 is a magnetic layer forming a magnetic closed circuit with a magnetic head. As the soft magnetic layer 4, for example, an amorphous cobalt (Co) alloy such as CoZrNb, CoZrTa, CoZrTa, FeCoB, or FeCoB can be used. The soft magnetic layer 4 may have a structure where each of these Co alloys and the non-magnetic layer are stacked. It is preferable that a material having a high Bs (equal to or greater than 1.5 T) in addition to FeCoB whose main ingredients are "Fe:Co=65:35", which has a highest Bs, be selected as a material for the soft magnetic layer 4. Here, "Bs" means saturation flux density.

The intermediate layer 5 functions as an orientation control layer so that crystallinity of the hard magnetic layer 6 formed on the intermediate layer 5 is improved. The intermediate layer 5 can be formed by stacking, for example, a Ru layer, a FeCoB layer and a Ru layer. The Ru layer has functions for improving orientation of a crystalline metal layer formed on the Ru layer.

The hard magnetic layer 6 has a high magnetic coercive force where, for example, the magnetic coercive force in a film surface vertical direction is equal to or greater than 8 kOe. The hard magnetic layer 6 has a fifteen-layers structure where, for example Co layers having thickness of 0.2 nm and Pd layer having thickness of 0.8 nm are alternately stacked. Although the inventors of the present invention attempted to measure electromagnetic properties of the hard magnetic layer 6, writing (magnetic recording) was not possible because the magnetic coercive force is extremely great.

As a protection layer, for example, CN may be formed on the hard magnetic layer 6.

Here, recording areas 9A and isolation areas 10 formed in the hard magnetic layer 6 are discussed. As shown in FIG. 1B, the recording areas 9A are formed with a designated pitch within the isolation areas 10. In a case where the magnetic recording medium 1A is used as a medium of the HDD, each of the recording areas 9A is a data recording area or a servo pattern area.

As discussed above, the hard magnetic layer 6 where the recording areas 9A are formed has a high magnetic coercive force equal to or greater than 8 kOe and therefore magnetic recording cannot be done in the recording areas 9A. In this embodiment, by the manufacturing method discussed below, ions are implanted into the hard magnetic layer 6. As a result of this, the magnetic coercive force of the hard magnetic layer 6 in the ion implantation positions is made lower than the magnetic coercive force of the rest of the hard magnetic layer 6 and thereby the recording areas 9A where the magnetic recording and reproducing can be done are formed in the hard magnetic layer 6. In addition, an area other than where the recording areas 9A are formed in the hard magnetic layer 6 is the isolation area 10. It is preferable that the magnetic coercive force of the recording areas 9A be equal to or less than approximately 5 kOe from the view point of noise reduction at the time of recording and reproducing.

In the magnetic recording medium 1A, the recording areas 9A where magnetic recording is done are formed so as to pierce the hard magnetic layer 6 in the thickness direction (upper and lower directions in FIG. 1A). In addition, the recording areas 9A have a magnetic coercive force capable of magnetic recording. The isolation areas 10 embed the recording areas 9A except for upper and lower surfaces of the recording areas 9A. Because of this, even if the magnetic recording is done in the recording areas 9A, since the magnetic coercive force of the isolation areas 10 is great, magnetic properties of the recording areas 9A do not disappear.

Next, a manufacturing method of the magnetic recording medium of the first embodiment of the present invention is discussed. In the following explanation, an example using the magnetic recording medium 1A shown in FIG. 1 is discussed. FIG. 2A through FIG. 2E are cross-sectional views for explaining the manufacturing method of the magnetic recording medium 1A of the first embodiment of the present invention. In FIG. 2A through FIG. 2E, parts that are the same as the parts shown in FIG. 1 are given the same reference numerals, and explanation thereof is omitted.

Figure 2A:
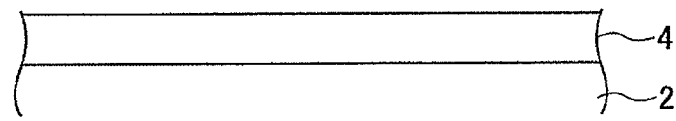
FIG. 2A through FIG. 2E are cross-sectional views for explaining a manufacturing method of the magnetic recording medium of the first embodiment of the present invention.

In order to manufacture the magnetic recording medium 1A, first, a FeCoB film having thickness of approximately 25 nm as the soft magnetic layer 4 is deposited on the glass substrate 1 at a gas pressure of approximately 0.5 Pa and a sputtering electric power of approximately 1 kW. In this example, the soft magnetic layer 4 is a single magnetic backing layer. FIG. 2A shows a state where the soft magnetic layer 4 is formed on the glass substrate 2.

Figure 2B:
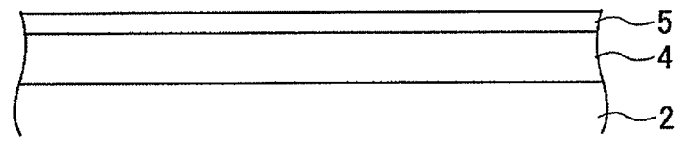

Next, the intermediate layer 5 is deposited on the soft magnetic layer 4. The intermediate layer 5 is formed by the following method. That is, a Ru layer having thickness of approximately 0.8 nm is deposited by sputtering at Ar (argon) gas pressure of approximately 0.8 Pa and a sputtering electric power of approximately 100 W. Then, on the Ru layer, a FeCoB layer having thickness of approximately 25 nm is deposited by sputtering at Ar gas pressure of approximately 0.5 Pa and a sputtering electric power of approximately 1 kW. Then, on the FeCoB layer, a Ru layer having thickness of approximately 10 nm is deposited by sputtering at Ar gas pressure of approximately 0.8 Pa and a sputtering electric power of approximately 0.3 kW. Thus, in this example, the intermediate layer 5 having a three-layer stacked structure of the Ru layer, the FeCoB layer and the Ru layer is formed. FIG. 2B shows a state where the intermediate layer 5 is formed on the soft magnetic layer 4.

After the intermediate layer 5 is formed as discussed above, the hard magnetic layer 6 is deposited on the intermediate layer 5. The hard magnetic layer 6 is formed by the following method. That is, a Co layer having thickness of approximately 0.2 nm is deposited on the intermediate layer 5 by sputtering at Ar (argon) gas pressure of approximately 1 Pa and a sputtering electric power of approximately 0.5 kW. Then, on the Co layer, a Pd layer having thickness of approximately 0.8 nm is deposited by sputtering at Ar gas pressure of approximately 1 Pa and a sputtering electric power of approximately 0.5 kW.

Figure 2C:
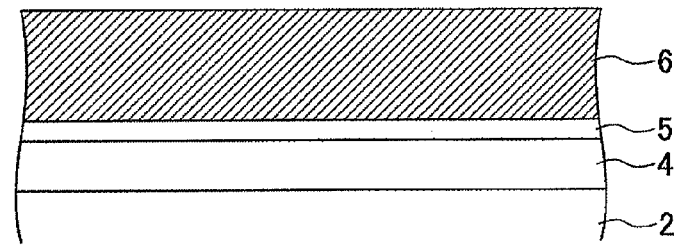

By repeating the above-mentioned forming of the Co layer and the Pd layer as one cycle 15 times, an artificial lattice structure of the Co films and the Pd films is formed. The hard magnetic layer 6 has a high magnetic coercive force where, for example, the magnetic coercive force in a film surface vertical direction is equal to or greater than 8 kOe. FIG. 2C shows a state where the hard magnetic layer 6 is formed on the intermediate layer 5. The hard magnetic layer 6 is not limited to having the artificial lattice structure of the Co films and the Pd films. The hard magnetic layer 6 may have an artificial lattice structure of, for example, Fe films and Pt films.

Last, a CN layer having thickness of approximately 3 nm is formed on the hard magnetic layer 6 as a protection film (not shown). It is preferable to apply a liquid lubricant layer on the protection film. By performing the steps shown in FIG. 2A through FIG. 2C, the magnetic recording film 3 including the soft magnetic layer 4, the intermediate layer 5, and the hard magnetic layer 6 is formed on the glass substrate 2.

After the magnetic recording film 3 is formed on the glass substrate 2 as discussed above, a mask is prepared. Openings are formed in the mask at positions corresponding to the forming areas of the recording area 9A on the magnetic recording films 3. An ion implantation process is performed on the magnetic recording film 3 via the mask. This ion implantation process is performed by using an ion implantation apparatus.

Figure 2D:
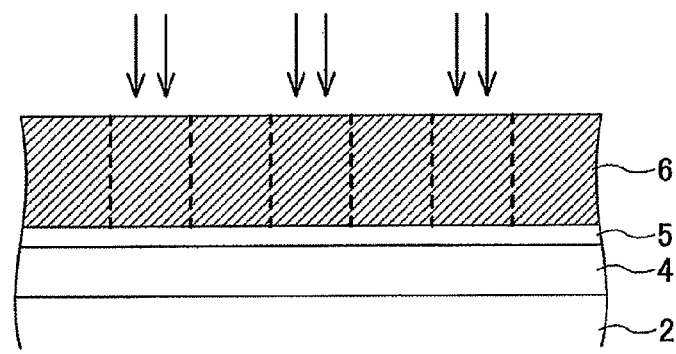

By controlling implantation energies, ion implantation is performed in the entirety of the thickness direction of the hard magnetic layer 6. In addition, there is no limitation of the ions to be implanted as long as the ionic species can reduce saturation magnetization of the hard magnetic layer 6. In this example, Ar ions are used as doping ions. In addition, as ion implantation conditions, implantation energy is set to approximately 25 keV and the dose amount is set to approximately $5 \times 10^{15}$ atoms/cm$^2$. FIG. 2D shows a state where the ion implantation is performed on the hard magnetic layer 6.

As discussed above, the ion implantation process for the hard magnetic layer 6 is performed on the recording areas 9A, not on other areas of the hard magnetic layer 6. In the area where the ion implantation process is performed, a quality for to entry of impurities of the hard magnetic layer 6 is generated so that the magnetic coercive force is degraded (reduced) as compared to that prior to the ion implantation. The amount of degradation of the magnetic coercive force in the ion implantation area can be controlled by kinds of doping ions, acceleration voltage at the time of doping, dose amount, and others.

Figure 2E:
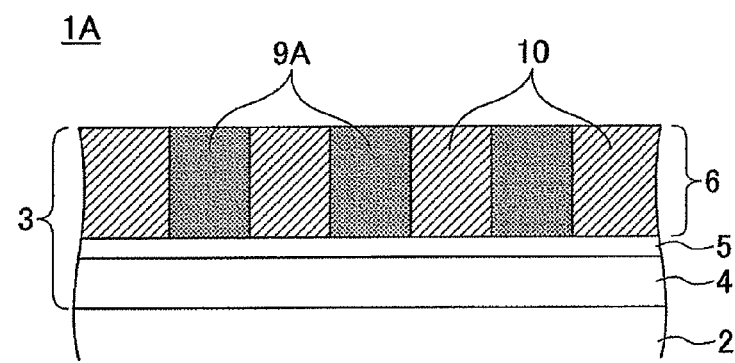

By performing the ion implantation process, the recording areas 9A and the isolation areas 10 are formed. The recording areas 9A have a magnetic coercive force whereby the magnetic recording can be done. The isolation areas 10 have a high magnetic coercive force (equal to or greater than 8 kOe) where the magnetic recording cannot be done. FIG. 2E shows a state where the recording areas 9A and the isolation areas 10 are formed in the hard magnetic layer 6.

In the magnetic recording medium 1A manufactured by this example, the isolation area 10 maintain the magnetic properties (properties including a high magnetic coercive force) of the hard magnetic layer 6 formed in a step shown in FIG. 2C, after the ion implantation process.

On the other hand, the magnetic coercive force of the recording areas 9A is reduced by the ion implantation so that the magnetic recording can be done. In addition, the magnetic coercive force of the recording areas 9A can be controlled by, as discussed above, kinds of doping ions, acceleration voltage at the time of doping, dose amount, and others.

Accordingly, it is possible to optionally set the magnetic properties of the recording areas 9A. Therefore, the recording areas 9A can be set corresponding to conditions of an apparatus using the magnetic recording medium 1A. Because of this, in a case where the magnetic recording medium 1A is used for the HDD, by setting the magnetic properties for every areas (data recording areas, servo pattern areas, and others), it is possible to perform the magnetic recording and reproducing process with high precision and a high degree of freedom. In addition, since the manufacturing method of this example can be performed by using a known deposition process or ion implantation process, it is possible to avoid that the manufacturing process becoming complex and manufacturing cost being increased.

Next, properties of the magnetic recording medium 1A are discussed with reference to FIG. 3.

FIG. 3 shows experimental results of the magnetic coercive force reduction effect by the ion implantation. In the experiment, a medium (hereinafter "test medium") where the hard magnetic layer 6 is deposited on the glass substrate 2 by the manufacturing method of the magnetic recording medium 1A is manufactured and then a square having sides of 10 mm is patterned. After that, ion implantation is performed by using the manufacturing method of the first embodiment of the present invention in the patterned area.

The magnetic coercive force (Hc) and standardization (Ms) were measured as implantation times changed while the energy of the Ar ion implantation was held constant. Standardization (Ms)* indicates a value in a case where Ms of sample 10 (after sputtering deposition is done; no ion implantation) is set to 1. These magnetic properties were evaluated by using a vibration sample type magnetometer (VSM).

A reference example shown in FIG. 3 indicates magnetic properties of the hard magnetic layer 6 when ion implantation is not performed. The magnetic coercive force of the hard magnetic layer 6 has a high value (8.5 kOe) and therefore magnetic recording cannot be performed on the hard magnetic layer 6.

Example 1-1 through example 1-4 indicate experimental results where the ion implantation time is 120 seconds, 300 seconds, 480 seconds, and 600 seconds, respectively. As shown in FIG. 3, as the implantation time is longer, the magnetic coercive force is gradually reduced. Accordingly, it was proved that magnetic properties of the magnetic recording areas 9A can be controlled (improved) by controlling the time of ion implantation into the hard magnetic layer 6.

In addition, it was found that the ratio of reduction of the magnetic coercive force is reduced if the implantation time exceed a certain time (300 seconds). Furthermore, by ion implantation for more than 480 second, it was possible to reduce the magnetic coercive force of the hard magnetic layer 6 to a value at which the magnetic recording process can be performed. In the meantime, ion implantation was performed on plural test media under conditions the same as the examples 1 through 3 and electromagnetic conversion properties of them were measured. The results where magnetic recording could be done and results where magnetic recording could not be done were generated. Accordingly, it was found that the upper limit of the writeable magnetic coercive force is approximately 6 kOe.

Next, a magnetic recording medium 1B of a second embodiment of the present invention and a manufacturing method of the magnetic recording medium 1B are discussed with reference to FIG. 4A and FIG. 4B.

Figure 4A:
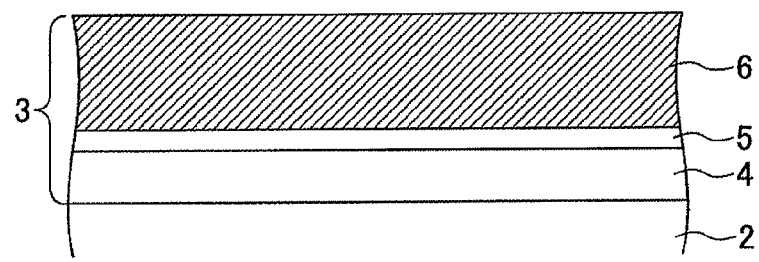
FIG. 4A and FIG. 4B are cross-sectional views for explaining a manufacturing method of a magnetic recording medium of a second embodiment of the present invention.
Figure 4B:
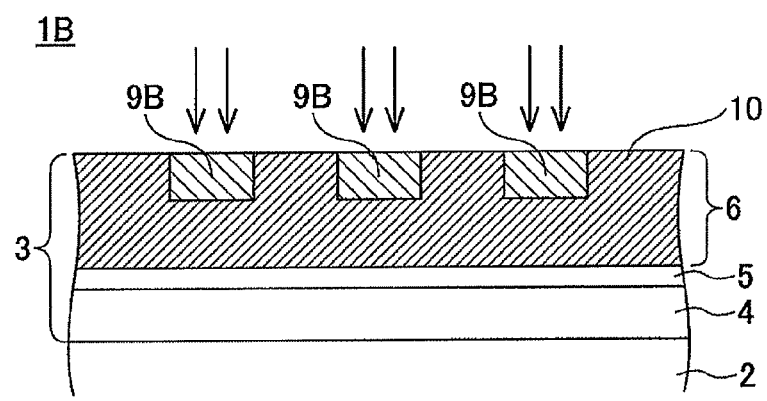

FIG. 4A and FIG. 4B are cross-sectional views for explaining a manufacturing method of the magnetic recording medium 1B of the second embodiment of the present invention. In FIG. 4A and FIG. 4B, parts that are the same as the parts shown in FIG. 1 and FIG. 2A through FIG. 2E are given the same reference numerals, and explanation thereof is omitted.

FIG. 4A shows a state where the magnetic recording film 3 is formed on the glass substrate 2. A structural body shown in FIG. 4A is equivalent to that shown in FIG. 2C and is manufactured by the same method as the manufacturing method of the first embodiment of the present invention. FIG. 4B shows a state where ion implantation is performed on the hard magnetic layer 6. In this embodiment, the ion implantation is performed on the hard magnetic layer 6 by the substantially same method as the method of the first embodiment of the present invention.

However, although the recording areas 9A are formed in the entirety in the thickness direction of the hard magnetic layer 6 in the magnetic recording medium 1A of the first embodiment, the recording areas 9B are partially formed in the thickness direction of the hard magnetic layer 6 in the magnetic recording medium 1B of the second embodiment. Accordingly, in the magnetic recording medium 1B of the second embodiment of the present invention, the recording areas 9B are not formed so as to pierce the isolation areas 10 (the hard magnetic layer 6) in the thickness direction, but formed partially in lad shapes as shown in FIG. 4B.

FIG. 5 shows experimental results of the magnetic coercive force reduction effect by the ion implantation of the magnetic recording medium 1B of the second embodiment of the present invention.

In this experiment as well as that discussed with reference to FIG. 3, the test medium is manufactured and then a square having sides of 10 mm is patterned. After that, ion implantation is performed by using the manufacturing method of the second embodiment of the present invention in the patterned area.

Examples 1-1, 2-1 and 2-2 in FIG. 5 indicate experimental results when the energy of implantation is changed while the implantation time is held (120 seconds). In addition, examples 2-2 and 2-3 indicate experimental results when the energy of implantation is set to be low (5 keV) and the time of implantation is changed.

As shown in FIG. 5, it was found that, when the implantation time is constant, as the energy of implantation is smaller, the magnetic coercive force becomes lower. In addition, it was found that, when the energy of implantation is low (5 keV) and lower, as the implantation time is increased, the magnetic coercive force becomes lower.

The inventors of the present invention observed cross sections of the examples 1-1 through 2-3 by using a TEM (transmission electron microscope). As a result of this, it was confirmed that, in the examples 1-1 through 2-3, composition inclination is provided in the hard magnetic layer 6 part and its modulation region is positioned nearer in the medium surface direction as the implantation energy becomes lower. In particular, by setting the implantation energy low so that the implantation amount is proper, the magnetic coercive force in the vicinity of the medium surface is degraded so that the magnetic coercive force of the entire hard magnetic layer is degraded.

Next, a magnetic recording medium 1C of a third embodiment of the present invention and a manufacturing method of the magnetic recording medium 1C are discussed with reference to FIG. 6A through FIG. 6E.

FIG. 6A through FIG. 6E are cross-sectional views for explaining a manufacturing method of the magnetic recording medium 1C of the third embodiment of the present invention. In FIG. 6A through FIG. 6E, parts that are the same as the parts shown in FIG. 1 and FIG. 2A through FIG. 2E are given the same reference numerals, and explanation thereof is omitted.

Figure 6A:
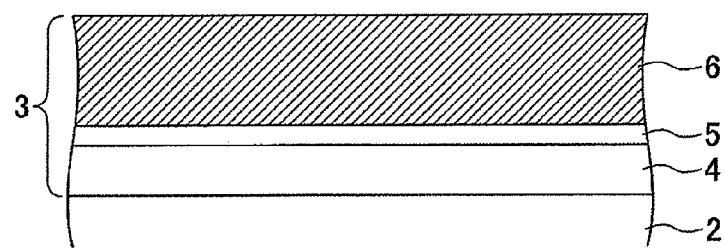
FIG. 6A through FIG. 6E are cross-sectional views for explaining a manufacturing method of a magnetic recording medium of a third embodiment of the present invention.

FIG. 6A shows a state where the magnetic recording film 3 is formed on the glass substrate 2. A structural body shown in FIG. 6A is equivalent to that shown in FIG. 2C and is manufactured by the same method as the manufacturing method of the first embodiment of the present invention.

Figure 6B:
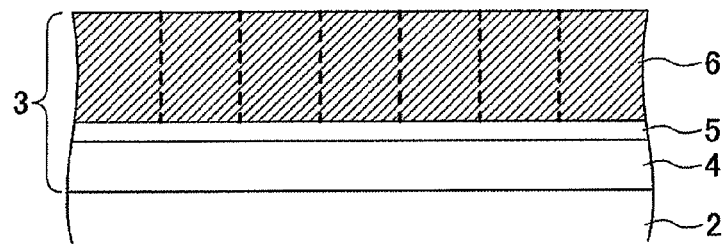
Figure 6C:
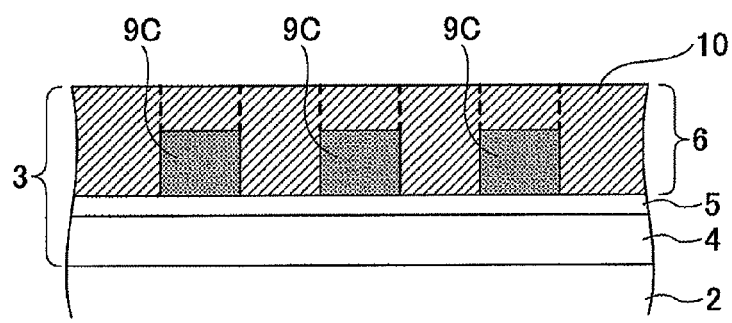

FIG. 6B shows a state where a first ion implantation is performed on the hard magnetic layer 6. The energy of implantation in the first ion implantation is set high (25 keV and 30 keV). Accordingly, the magnetic coercive force is reduced in an especially deep position of the ion implantation position. FIG. 6C shows a state where the first ion implantation is completed.

Figure 6D:
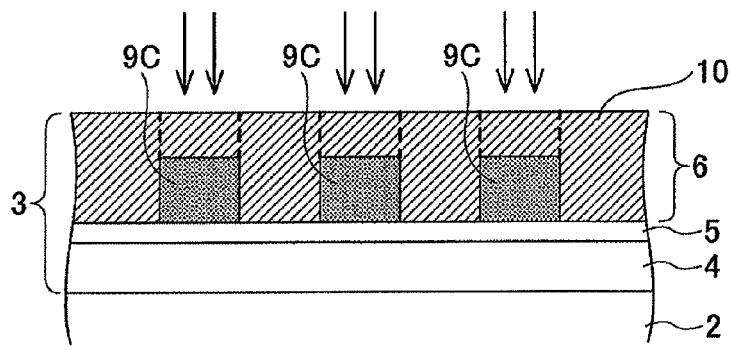

Next, a second ion implantation is performed on the medium where the recording areas 9C are formed (see FIG. 6D). Energy used for the second ion implantation is 5 KeV and lower than the energy used for the first ion implantation.

Figure 6E:
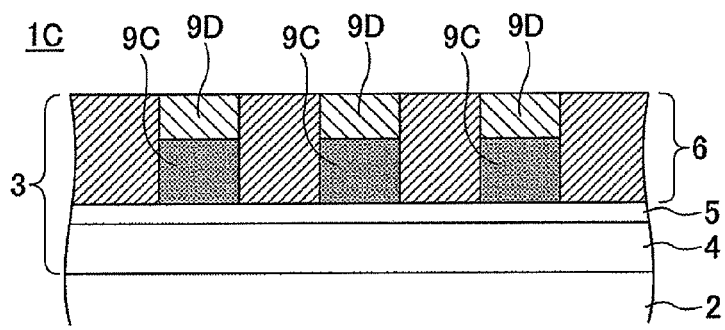

As a result of this, recording areas 9D having a magnetic coercive force smaller than that of the recording areas 9C are formed on the corresponding recording areas 9C. In other words, the magnetic recording medium 1C of this embodiment has a structure where plural (two in this embodiment) recording area layers 9C and 9D having different magnetic coercive forces are stacked. FIG. 6E shows a state where the magnetic recording medium 1C having a structure where the recording area layers 9C and 9D are stacked, is formed.

FIG. 7 shows experimental results of the magnetic coercive force reduction effect in the recording area 9C formed by the first ion implantation and 9D formed by the second ion implantation during manufacturing steps of the magnetic recording medium 1C of the third embodiment of the present invention.

In this experiment as well as that discussed with reference to FIG. 6A through FIG. 6C, patterning of a square having sides of 10 mm is applied to the hard magnetic layer 6 formed on the glass substrate 2. After that, the first and second ion implantations are performed by using the manufacturing method of the third embodiment of the present invention in the patterned area.

Examples 1-1, 3-1 and 3-2 in FIG. 7 indicate experimental results of the first ion implantation when the energy of implantation is changed while the implantation time is held constant (120 seconds). More specifically, the energy of implantation in the example 1-1 is 20 keV; the energy of implantation in the example 3-1 is 25 keV; and the energy of implantation in the example 3-2 is 30 keV.

Examples 3-3 and 3-4 in FIG. 7 indicate experimental results of the second ion implantation, where the energy of implantation is constant (5 keV) while the implantation time is changed. More specifically, the time of implantation in the example 3-3 is 300 seconds; and the time of implantation in the example 3-4 is 480 seconds.

As shown in FIG. 7, the reduction of the magnetic coercive force of the entirety of the hard magnetic layer 6 is obtained when the energy of implantation is high. Accordingly, by performing the second ion implantation shown in FIG. 6D, the hard magnetic layer 6 can have a multilayer structure formed by the recording areas 9C and 9D.

The inventors of the present invention observed cross-sections of the examples 1-1, 3-3 and 3-4 by using a TEM (transmission electron microscope). As a result of this, it was confirmed that composition inclination is provided in the hard magnetic layer part by the first ion implantation and the second ion implantation. In addition, the magnetic coercive force of the recording area layer positioned in the medium surface side is smaller than the magnetic coercive force of the recording area layer positioned in the glass substrate 2 side.

Figure 8:
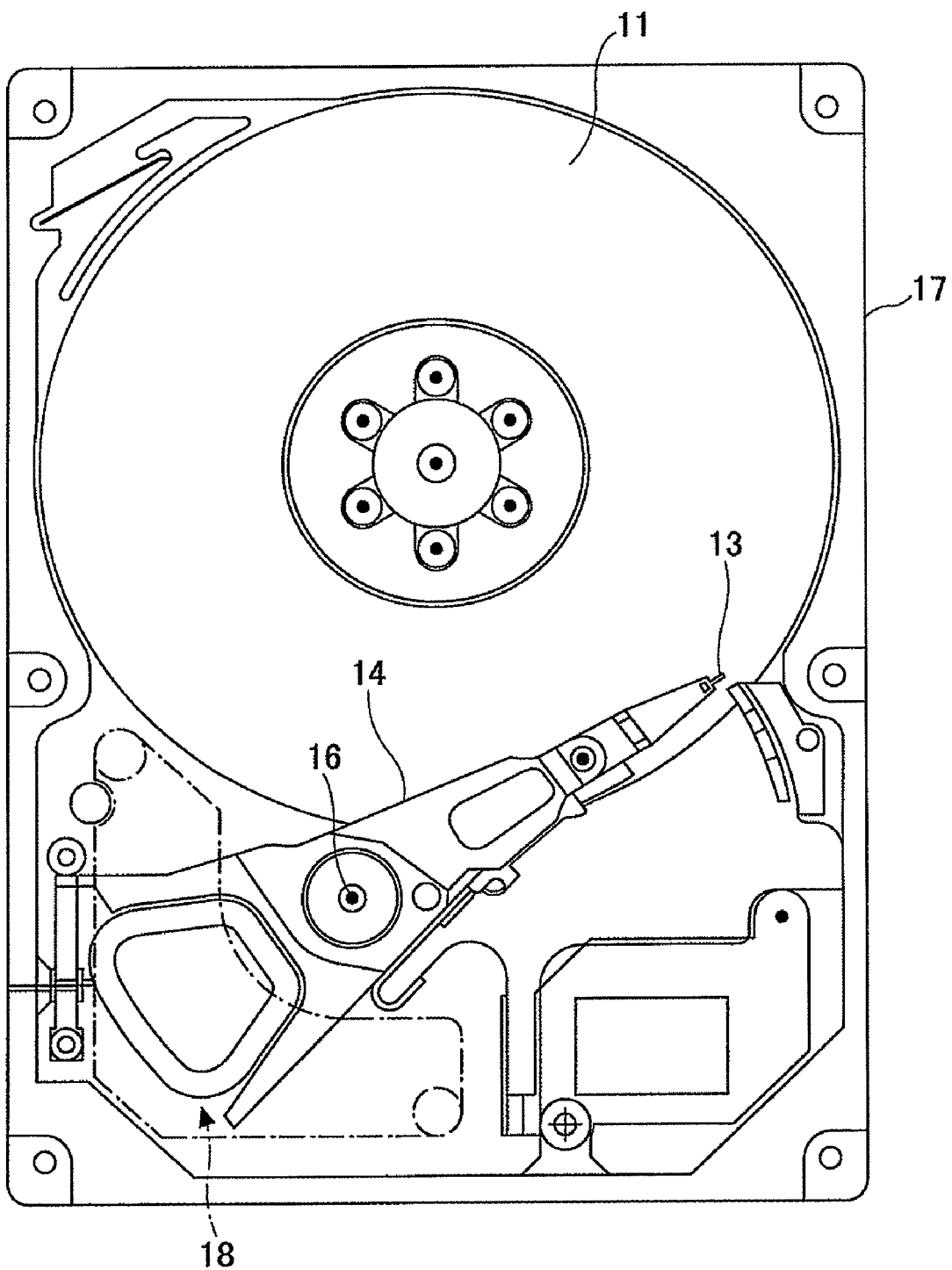
FIG. 8 is a plan view of a magnetic recording and reproducing apparatus of the embodiment of the present invention.

Next, a magnetic recording and reproducing apparatus 20 where the magnetic recording media 10A through 10C of the embodiment of the present invention can be installed is discussed with reference to FIG. 8. FIG. 8 is a plan view of the magnetic recording and reproducing apparatus 20 of the embodiment of the present invention. The magnetic recording and reproducing apparatus 20 is a hard disk apparatus installed in a personal computer, as a recorder of a television set, or the like.

In the magnetic recording and reproducing apparatus 20, the magnetic recording medium 10 as a hard disk is mounted in a housing 17. The magnetic recording medium 10 can be rotated by a spindle motor or the like (not shown). In addition, a carriage arm 14 is provided inside the housing 17. The carriage arm 14 can be rotated with respect to a shaft 16 by a voice coil motor (VCM) 18. The magnetic head 13 is provided at a head end of the carriage arm 14. The magnetic head 13 scans above the magnetic recording medium 10 so that magnetic information is written in or read from the magnetic recording medium 10.

There is no limitation of the kind of the magnetic head 13. The magnetic head may be formed of a magnetic resistance element such as Giant Magneto-Resistive (GMR) element or a Tunneling Magneto-Resistive (TuMR) element. In addition, the magnetic recording and reproducing apparatus is not limited to the above-discussed hard disk apparatus. The magnetic recording and reproducing apparatus 20 may be an apparatus configured to record the magnetic information on a flexible tape magnetic recording medium.

According to the above-discussed magnetic recording medium, it is possible to optionally set magnetic properties of a magnetic recording area by selection of ion species for ion implantation, control of an accelerating voltage at the time of the ion implantation, or the like. In addition, it is possible to individually set the magnetic properties of the magnetic recording area for every magnetic recording area so that various magnetic recording media can be realized.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2008-81639 filed on Mar. 26, 2008, the entire contents of which are hereby incorporated herein by reference.

What is claimed is:

1. A manufacturing method of a magnetic recording medium, the magnetic recording medium having a structure where plural magnetic recording areas and isolation areas in a magnetic recording layer are formed on a non-magnetic substrate, the isolation areas being configured to magnetically isolate the magnetic recording areas, the manufacturing method comprising:

forming a magnetic layer over the non-magnetic substrate, the magnetic layer being made of a hard magnetic material having a magnetic coercive force disabling magnetic recording; and performing ion implantation partially at positions corresponding to the plural magnetic recording areas of the magnetic layer so that the magnetic recording areas are formed by reducing the magnetic coercive force in the positions of the ion implantation to a magnetic-recordable magnetic coercive force, and allowing the isolation areas to maintain the magnetic coercive force disabling magnetic recording, wherein, in the performing the ion implantation partially at the positions corresponding to the plural magnetic recording areas of the magnetic layer, after a first ion implantation is performed, a second ion implantation is performed by using an ion implantation energy different from an enemy used for the first ion implantation.

2. The manufacturing method of the magnetic recording medium as claimed in claim 1,
wherein, in the forming the magnetic recording areas, the magnetic recording areas are formed entirely in a thickness direction of the magnetic recording layer.

3. The manufacturing method of the magnetic recording medium as claimed in claim 1,
wherein, in the forming the magnetic recording areas, the magnetic recording areas are formed so that depth from the surface of the magnetic recording areas becomes less than the thickness of the magnetic recording layer.

4. The manufacturing method of the magnetic recording medium as claimed in claim 1,
wherein the hard magnetic material is a multilayer film formed by stacking a Co film and a Pt film.

5. The manufacturing method of the magnetic recording medium as claimed in claim 1,
wherein the hard magnetic material is a multilayer film formed by stacking a Co film and a Pd film.

* * * * *

UNITED STATES PATENT AND TRADEMARK OFFICE
CERTIFICATE OF CORRECTION

PATENT NO. : 8,277,874 B2  
APPLICATION NO. : 12/256148  
DATED : October 2, 2012  
INVENTOR(S) : Shimizu et al.

Page 1 of 1

It is certified that error appears in the above-identified patent and that said Letters Patent is hereby corrected as shown below:

In the Claims:

Column 11, line 6, delete the word "enemy" and replace with the word "energy".

Signed and Sealed this
Twelfth Day of November, 2013

Teresa Stanek Rea
*Deputy Director of the United States Patent and Trademark Office*